United States Patent
Miki et al.

(10) Patent No.: US 8,361,586 B2
(45) Date of Patent: Jan. 29, 2013

(54) OPTICAL RECORDING MEDIUM

(75) Inventors: Takeshi Miki, Tokyo (JP); Yuuki Tauchi, Hyogo (JP)

(73) Assignees: Sony Corporation, Tokyo (JP); Kobe Steel, Ltd., Hyogo (JP)

( * ) Notice: Subject to any disclaimer, the term of this patent is extended or adjusted under 35 U.S.C. 154(b) by 244 days.

(21) Appl. No.: 12/854,567

(22) Filed: Aug. 11, 2010

(65) Prior Publication Data

US 2011/0044157 A1   Feb. 24, 2011

(30) Foreign Application Priority Data

Aug. 20, 2009   (JP) ................................ 2009-190650

(51) Int. Cl.
*B32B 3/02* (2006.01)

(52) U.S. Cl. .................... 428/64.1; 428/64.4; 428/64.5; 428/64.6; 430/270.13

(58) Field of Classification Search ................. 428/64.4
See application file for complete search history.

(56) References Cited

U.S. PATENT DOCUMENTS

| 7,972,674 B2 * | 7/2011 | Habuta et al. ................ 428/64.1 |
| 2005/0082162 A1 | 4/2005 | Uno et al. |
| 2006/0161942 A1 | 7/2006 | Kikukawa et al. |
| 2008/0080352 A1 | 4/2008 | Kitaura et al. |

FOREIGN PATENT DOCUMENTS

| CN | 1606080 A | 4/2005 |
| CN | 1816859 A | 8/2006 |
| JP | 2008-112556 | 5/2008 |

OTHER PUBLICATIONS

Chinese Office Action issued Dec. 12, 2011, for corresponding Chinese Appln. No. 201010254835.1.

* cited by examiner

*Primary Examiner* — Elizabeth Mulvaney
(74) *Attorney, Agent, or Firm* — K&L Gates LLP (57) ABSTRACT

An optical recording medium includes: a substrate; an information recording layer that is formed on the substrate and that has a recording film, which contains Zn or Al, Pd, and oxygen and in which the amount of oxygen is larger than that in a stoichiometric composition when Zn or Al is completely oxidized to become ZnO or $Al_2O_3$; and a light transmissive layer formed on the information recording layer.

5 Claims, 7 Drawing Sheets

JITTER OF ZnO-Pd-O FILM

FIG.3B

MODULATION AND ASYMMETRY OF ZnO-Pd-O FILM

FIG.4A

JITTER OF Zn-In-Sn-Pd-O FILM

FIG.4B

MODULATION AND ASYMMETRY OF Zn-In-Sn-Pd-O FILM

FIG.5A

JITTER IN CASE OF Zn-In-Sn-Pd-O FILM + UPPER AND LOWER PROTECTIVE FILMS

FIG.5B

MODULATION AND ASYMMETRY IN CASE OF Zn-In-Sn-Pd-O FILM + UPPER AND LOWER PROTECTIVE FILMS

FIG.6A

JITTER OF Al-Pd-O FILM

FIG.6B

MODULATION AND ASYMMETRY OF Al-Pd-O FILM

FIG.7A

JITTER OF Zn-Al-In-Pd-O FILM

FIG.7B

MODULATION AND ASYMMETRY OF Zn-Al-In-Pd-O FILM

OPTICAL RECORDING MEDIUM

CROSS REFERENCES TO RELATED APPLICATIONS

The present application claims priority to Japanese Priority Patent Application JP 2009-190650 filed in the Japan Patent Office on Aug. 20, 2009, the entire contents of which is hereby incorporated by reference.

BACKGROUND

The present application relates to an optical recording medium, such as an optical disc, and in particular, to a recording layer material thereof.

In recent years, the recording density and the capacity of optical discs, which is one of the media using an optical information recording method, have improved along with the spread of personal computers, the start and spread of terrestrial digital broadcasting, and the spread of high-definition televisions to homes. For example, a CD (Compact Disc) and a DVD (Digital Versatile Disc), a Blu-ray disc (registered trademark), and an optical disc recording medium capable of recording a larger amount of information are available.

The Blu-ray disc, as a large-capacity optical disc recording medium, is an optical disc which has a diameter of about 12 cm and a thickness of about 1.2 mm. As its layer structure in the thickness direction, an information recording layer is formed in an uneven shape on a substrate with a thickness of about 1.1 mm. The information recording layer is formed by sequentially laminating a reflective film (metal thin film), a dielectric film, a recording film, and a dielectric film, for example.

In addition, a light transmissive layer (cover layer) with a thickness of about 0.1 mm is formed on the information recording layer.

Such a Blu-ray disc has a storage capacity of about 25 GB (Giga Byte).

Regarding a recording material for the recording film, for example, materials disclosed in JP-A-2008-112556 are known.

SUMMARY

As Blu-ray discs (BD) have come into wide use, improvements in efficiency or cost reductions in the manufacturing process of a Blu-ray disc are strongly demanded.

For example, in a current Blu-ray disc, the information recording layer has a multi-layer structure which includes a recording film, a reflective film, a dielectric film, and the like. For this reason, a large sputtering apparatus is necessary. That is, if the information recording layer is formed using multiple layers, it not only takes time to form the multiple layers, but also an expensive film forming apparatus having several film forming chambers is necessary.

Taking manufacturing efficiency or the cost into consideration, a simple information recording layer which has a single-layer structure or has a reduced number of films is preferable.

It is a matter of course that good recording and reproduction characteristics should be obtained, not merely making the layer structure simple.

In view of the above, it is desirable to provide an optical recording medium having an information recording layer with a simple layer structure and capable of obtaining very good recording and reproduction characteristics.

According to an embodiment, there is provided an optical recording medium including: a substrate; an information recording layer that is formed on the substrate and that has a recording film, which contains Zn (zinc) or Al (aluminum), Pd (palladium), and O (oxygen) and in which the amount of oxygen is larger than that in a stoichiometric composition when Zn or Al is completely oxidized to become ZnO or $Al_2O_3$; and a light transmissive layer formed on the information recording layer.

The information recording layer may further contain In or Sn.

The information recording layer may be formed in a single-layer structure which has only the recording film.

In addition, the information recording layer may be formed in a multi-layer structure which has the recording film and a protective film.

That is, in the embodiment, the recording film which forms the information recording layer has a Zn oxide (or an Al oxide) as a main component. Moreover, Pd is further contained, and the amount of oxygen is larger than that in the stoichiometric composition in the case of ZnO or $Al_2O_3$. That is, oxygen atoms combine with at least some Pd atoms after total oxidation of Zn (or Al). For example, it becomes PdO and $PdO_2$. Unstable Pd oxides, such as PdO and $PdO_2$, react by laser irradiation for recording and as a result, a recording mark with a different reflectance from the periphery is formed.

In the optical recording medium according to the embodiment, very good recording and reproduction characteristics can be obtained by making the information recording layer have a recording film which contains Zn or Al, Pd, and O and in which the amount of oxygen is larger than that in the stoichiometric composition when Zn or Al is completely oxidized to become ZnO or $Al_2O_3$.

Moreover, since sufficient reflectance is obtained for the information recording layer, a reflective film is not necessary. Accordingly, the information recording layer can have a very simple layer structure, such as a single-layer structure or a multi-layer structure in which only a protective film is added. As a result, significant improvements in manufacturing efficiency and cost reductions can be realized.

Additional features and advantages are described herein, and will be apparent from the following Detailed Description and the figures.

DETAILED DESCRIPTION

Hereinafter, embodiments of the present application will be described in following order.
1. Optical disc structure
2. Experimental examples

1. OPTICAL DISC STRUCTURE

Figure 1A:
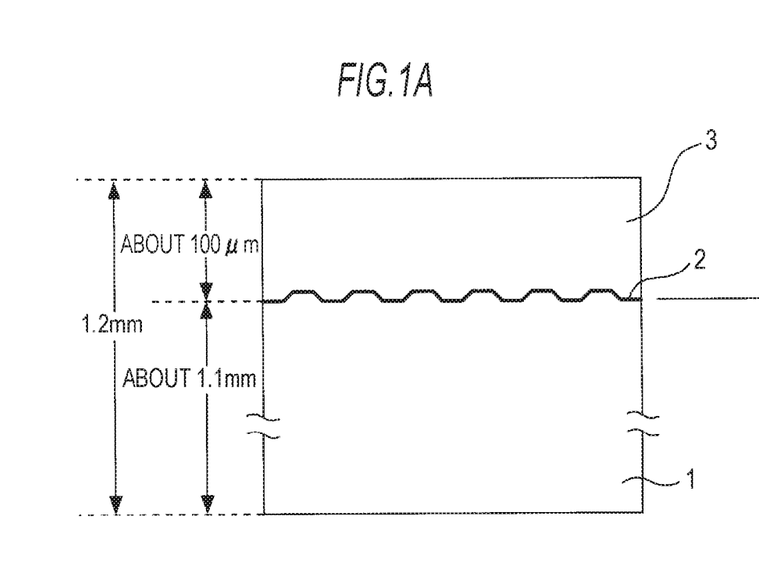
FIGS. 1A to 1E are explanatory views of the structure of an optical disc according to an embodiment.

FIG. 1A is a view schematically showing the layer structure of an optical disc according to an embodiment. This is an example of the structure in the case of a Blu-ray disc with a single layer (information recording layer of one layer), for example.

The optical disc in this example has an information recording layer 2 and a light transmissive layer (cover layer) 3 formed on one surface of a disc-shaped substrate 1 which has a thickness of about 1.1 mm and an external diameter of about 120 mm. In the drawing, an upper side is a laser incidence surface on which a laser beam is incident at the time of recording and reproduction.

The substrate 1 is formed by injection molding of polycarbonate resin, for example. In this case, since a stamper to which the uneven shape of a wobbling groove for tracking was transferred from an original master disc is disposed in a die, the substrate 1 is formed in a state where the unevenness of the stamper is transferred. That is, the substrate 1 formed with a wobbling groove serving as a recording track is formed by injection molding.

The information recording layer 2 is formed on one surface of the substrate 1, that is, on the surface of the substrate 1 formed with unevenness as a wobbling groove.

In this example, the information recording layer 2 has a recording film (Zn—Pd—O recording film) which contains Zn, Pd, and oxygen and in which the amount of oxygen is larger than that in the stoichiometric composition when Zn is completely oxidized to become ZnO.

Alternatively, the information recording layer 2 has a recording film (Al—Pd—O recording film) which contains Al, Pd, and oxygen and in which the amount of oxygen is larger than that in the stoichiometric composition when Al is completely oxidized to become $Al_2O_3$.

In addition, In (indium) or Sn (tin) may also be contained. For example, it is a Zn—In—Sn—Pd—O recording film, a Zn—Al—In—Pd—O recording film, or an Al—In—Sn—Pd—O recording film.

Figure 1B:
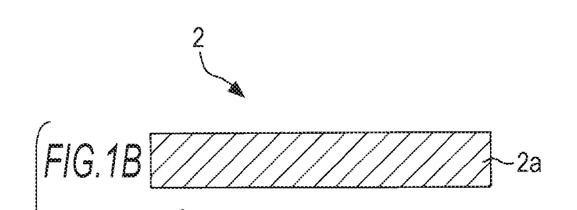

The information recording layer 2 has a single-layer structure of a recording film 2a as shown in FIG. 1B, for example.

Figure 1C:
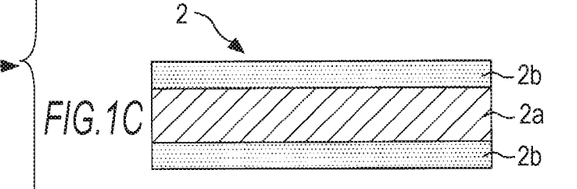

Moreover, according to circumstances, it is possible to consider an example of a multi-layer structure in which a protective film 2b, such as a dielectric film, is provided on the top and bottom surfaces of the recording film 2a as shown in FIG. 1C.

Figure 1D:
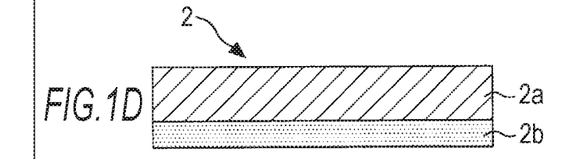
Figure 1E:
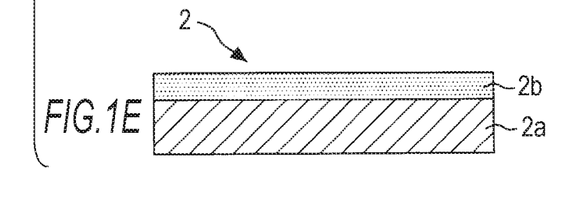

Alternatively, it is also possible to consider an example of a multi-layer structure in which the protective film 2b, such as a dielectric film, is provided on the top surface or the bottom surface of the recording film 2a as shown in FIGS. 1D and 1E.

The forming of the recording film 2a as the information recording layer 2 is performed by sputtering. For example, in the case of a Zn—Pd—O recording layer, the recording film 2a is formed by a sputtering method using a ZnO target and a Pd target while making argon gas and oxygen gas flow.

As shown in FIG. 1A, the top surface (laser irradiation surface side) of the information recording layer 2 is the light transmissive layer 3.

The light transmissive layer 3 is formed to protect the optical disc. Recording and reproduction of an information signal is performed, for example, when laser beams are condensed on the information recording layer 2 through the light transmissive layer 3.

The light transmissive layer 3 is formed, for example, by spin coating of UV (ultraviolet) curable resin and UV irradiation. Alternatively, the light transmissive layer 3 may be formed using UV curable resin and a polycarbonate sheet or an adhesive layer and a polycarbonate sheet.

The light transmissive layer 3 has a thickness of about 100 μm, and the total thickness of the optical disc including the substrate 1 having a thickness of 1.1 mm is about 1.2 mm.

Moreover, although not shown in the drawing, hard coating may be performed on the surface (laser irradiation surface) of the light transmissive layer 3 in order to protect the optical disc from mechanical shock and protect the optical disc from being damaged, and also to protect the recording and reproduction quality of the information signal from adhesion of fingerprints when handled by the user.

As a hard coat, it is possible to use a UV curable resin in which fine powders, such as silica gel, are mixed to improve the mechanical strength, a solvent type UV curable resin, or a non-solvent type UV curable resin.

In order to have mechanical strength and to shed oil and fat content, such as fingerprints, the hard coat is set to have a thickness of 1 μm to several μm.

In such an optical disc of this example, the information recording layer 2 has a single-layer structure of only the recording film 2a as shown in FIGS. 1A and 1B.

In addition, the recording film 2a contains Zn or Al, Pd, and O, and the amount of oxygen is larger than that in the stoichiometric composition when Zn or Al is completely oxidized.

That is, oxygen atoms combine with at least some Pd atoms after total oxidation of Zn (or Al), thereby forming PdO and $PdO_2$.

This means that Pd and O are contained in addition to a stable oxide, such as ZnO or $Al_2O_3$. Accordingly, if a laser beam is irradiated, PdO and $PdO_2$ react instead of ZnO or $Al_2O_3$.

That is, by laser irradiation, PdO reacts to be decomposed into Pd and $O_2$ and $PdO_2$ reacts to be decomposed into PdO and $O_2$. In addition, also from a structural point of view, bulging occurs as oxygen appears. As a result, a recording mark with a different reflectance from the periphery is formed.

According to the recording film 2a, it was possible to obtain very good recording and reproduction characteristics, which will be described later in experimental examples. For example, sufficient characteristics as a Blu-ray disc were obtained in terms of S/N of a reproduced signal, reflectance, transmittance, recording sensitivity, recording margin, and the like.

Moreover, structurally, it is suitable for control of reflectance and transmittance. For a recording film, it is possible to control the combination state of Pd and oxygen through the content of oxygen and the like. Accordingly, it is possible to control the reflectance and the transmittance of the recording layer to desired values by controlling the combination state of Pd and oxygen.

In this case, there are three kinds of states of Pd atoms in the recording layer. These are Pd when a Pd atom exists singly and does not combine with an oxygen atom, PdO when a Pd atom combines with one oxygen atom, and PdO$_2$ when a Pd atom combines with two oxygen atoms. Depending on the content of oxygen, one to three of the states exist.

If the ratio of Pd atoms which have not combined with oxygen atoms is high, the metal characteristics become strong. In this case, the transmittance of a recording layer becomes low and the reflectance of the recording layer becomes high. On the other hand, if the ratio of Pd atoms which combine with oxygen atoms is high, the oxide characteristics become strong. In this case, the transmittance of the recording layer increases and the reflectance of the recording layer decreases.

In other words, it is possible to obtain sufficient reflectance with the single-layer recording film 2a shown in FIG. 1B. For example, a reflectance of about 17% can be easily obtained.

This means that a reflective film as the information recording layer 2 does not need to be formed separately from the recording film 2a. Therefore, since the information recording layer 2 can be formed to have a single-layer structure, the layer structure can be made very simple.

Thus, sufficient recording and reproduction characteristics are obtained by the single-layer structure and it can be used as a Blu-ray disc, for example. However, in order to improve the durability further, the multi-layer structure in which the protective film 2b, such as a dielectric film, is provided may also be applied as shown in FIGS. 1C to 1E.

As materials of the protective film 2b for improving the durability, oxides, such as In—O, Zn—O, Al—O, Sn—O, Ga—O, Si—O, Ti—O, V—O, Cr—O, Nb—O, Zr—O, Hf—O, Ta—O, and Bi—O, may be considered. Moreover, nitrides, such as SiN and AlN, and carbides, such as SiC, may also be mentioned as a material for the protective film 2b.

The multi-layer structure in which the protective film 2b is added is disadvantageous compared with the single-layer structure in terms of manufacturing efficiency or costs. However, it is simpler than the known structures (for example, reflective film-dielectric film-recording film-dielectric film). Particularly in the cases of two-layer films shown in FIGS. 1D and 1E, advantages over the known structures in terms of manufacturing efficiency or the cost are sufficiently obtained.

In addition, for the case of a multi-layer disc, it is ideal that the reflectance and the transmittance can be controlled by the amount of oxygen as described above.

Figure 2A:
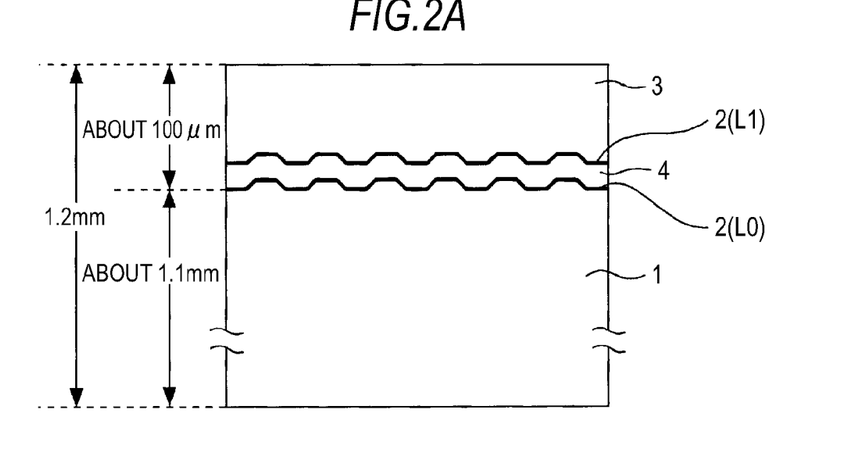
FIGS. 2A to 2C are explanatory views of the structure of a multi-layer disc according to the embodiment.
Figure 2B:
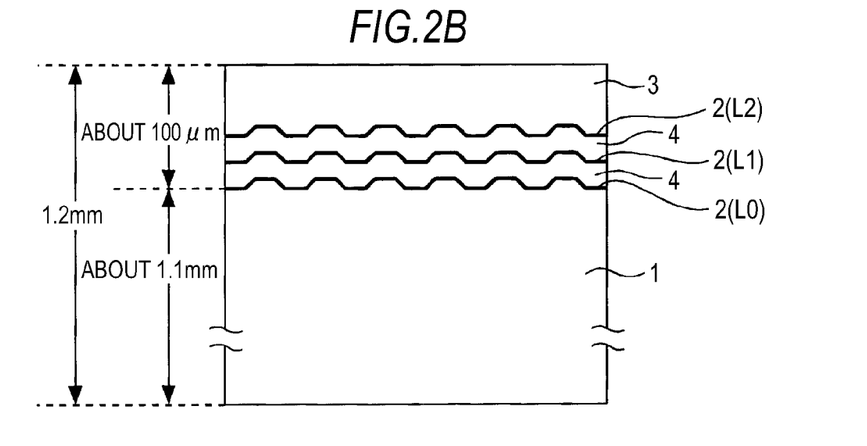
Figure 2C:
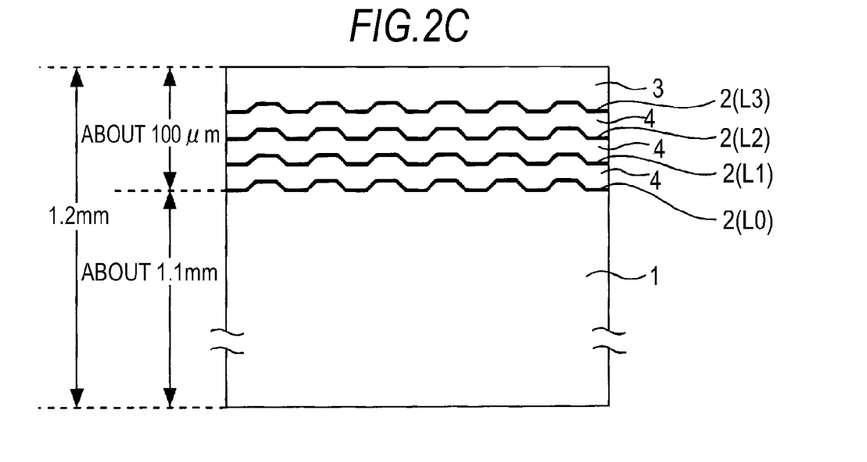

FIGS. 2A to 2C are views schematically showing the structures in the case of a multi-layer disc.

FIG. 2A shows a case of a so-called dual layer disc in which two layers of L0 and L1 layers are provided as the information recording layer 2.

A first information recording layer 2(L0) is formed on the substrate 1, and a second information recording layer 2(L1) is further formed with an intermediate layer 4 interposed therebetween. In addition, the light transmissive layer 3 is formed on the second information recording layer 2(L1).

FIG. 2B shows a case of a three-layer disc in which three layers of L0, L1, and L2 are provided as the information recording layer 2. Also in this case, each of the information recording layers 2(L0), 2(L1), and 2(L2) is formed on the substrate 1 with the intermediate layer 4 interposed therebetween.

FIG. 2C shows a case of a four-layer disc in which four layers of L0, L1, L2, and L3 are provided as the information recording layer 2. Also in this case, each of information recording layers 2(L0), 2(L1), 2(L2), and 2(L3) is formed on the substrate 1 with the intermediate layer 4 interposed therebetween.

In FIGS. 2A to 2C, each intermediate layer 4 is formed by spin-coating a light transmissive material, which has UV photosensitivity, by a spin coat method and curing it by irradiation of ultraviolet rays, for example. In the case of recording an information signal on a multi-layer optical disc recording medium or reproducing the information signal from the multi-layer optical disc recording medium, the arrangement and thickness of the intermediate layer 4 are set to suppress crosstalk between layers.

In these multi-layered discs, the reflectances and transmittances of layers (L1 to L3 layers) located closer to the laser irradiation surface than the L1 layer should be appropriately set.

That is, the recording film 2 in each of the L0 to L3 layers needs to be formed such that the signal quantity from the respective layers when reading the information becomes equal.

Here, the L1 to L3 layers are also formed by the recording film 2a which contains Zn or Al, Pd, and O, and in which the amount of oxygen is larger than that in the stoichiometric composition when Zn or Al is completely oxidized as described above with reference to FIGS. 1A to 1E.

In this case, a desired reflectance/transmittance can be obtained by controlling the amount of oxygen at the time of sputtering for forming the recording film 2a.

Regarding this point as well, the recording film 2a in the present embodiment is suitable.

2. EXPERIMENTAL EXAMPLES

Hereinafter, <first experiment> to <fifth experiment> will be described as experimental examples.

Moreover, in each experimental example, a recordable Blu-ray disc with a single-layer disc structure which had one information recording layer 2 as shown in FIG. 1A was generated, and recording and reproduction of test data were performed by a Blu-ray disc recording/reproduction apparatus.

First Experiment

As a disc in the <first experiment>, the information recording layer 2 using a Zn—Pd—O recording film with a thickness of 50 nm was formed on the substrate 1 made of polycarbonate so as to have a single-layer structure shown in FIG. 1B, and the light transmissive layer 3 with a thickness of 100 µm was formed.

ZnO and Pd were used as targets at the time of sputtering of the Zn—Pd—O recording film.

The composition was adjusted by controlling the sputtering power of each target.

The composition was set to satisfy Zn:Pd=6:4.

Ar gas and O2 gas were used at the time of sputtering.

The gas flow rate was set to 70 sccm for Ar gas and 30 sccm for O2 gas.

In addition, since the oxidation of Pd is insufficient if the amount of oxygen is small at the time of sputtering, oxygen equal to or greater than a certain level is necessary. This is the same for each experimental example to be described later.

Disc evaluation was performed by recording five tracks continuously at 1× recording speed (4.92 m/sec) and measuring the jitter, modulation, and asymmetry of a middle track.

In addition, the jitter, the modulation, and the asymmetry referred to herein are those generally used as indexes of signal evaluation.

In general, reproduction of an optical disc is performed using a method of irradiating a semiconductor laser beam onto the disc and detecting the returning light. The signal characteristics are evaluated by determining how correctly the recorded digital signal is reproduced. At the time of reproduction, a Blu-ray disc rotates at the linear speed of 4.92 m/sec and one clock is defined as 15.15 ns. Accordingly, it is realized with pits and spaces of 2 T to 8 T (30.30 ns to 121.20 ns) (T is a channel clock period).

For the jitter, deviation from a defined clock is expressed as σ/T using the standard deviation σ and 1 T.

It can be said that a reproduced signal deteriorates more as the value of jitter becomes larger.

For example, in the case of a Blu-ray disc, the jitter is preferably 7% or less. Undoubtedly, the lower the jitter, the better.

In actual manufacturing, the jitter is set to 6% or less in consideration of the margin.

The modulation is expressed as (I8 H–I8 L)/(I8 H).

Here, "I8 H" is a peak level of a reproduced RF signal waveform of an 8 T pattern, "I2 H" is a peak level of a 2 T pattern, "I2 L" is a bottom level of a 2 T pattern, and "I8 L" is a bottom level of an 8 T pattern.

The modulation expressed as the above-described expression is a size of 8 T amplitude and is an index depending on the depth of 8 T pit. It can be said that a C/N ratio becomes better as this value becomes larger.

The asymmetry is expressed as {(I8 H+I8 L)–(I2 H+I2 L)}/{2(I8 H–I8 L)} and means deviation of the central axis of an 8 T signal and a 2 T signal.

The asymmetry is an index which is important when determining the threshold level of binarization. In the case of a Blu-ray disc, it is determined as –10 to 15%.

This asymmetry value is a signal acquired because the size of a long pit (for example, 8 T pit) and the size of a 2 T pit are different, and is largely influenced by a small change in the mark size and changes accordingly.

Figure 3A:
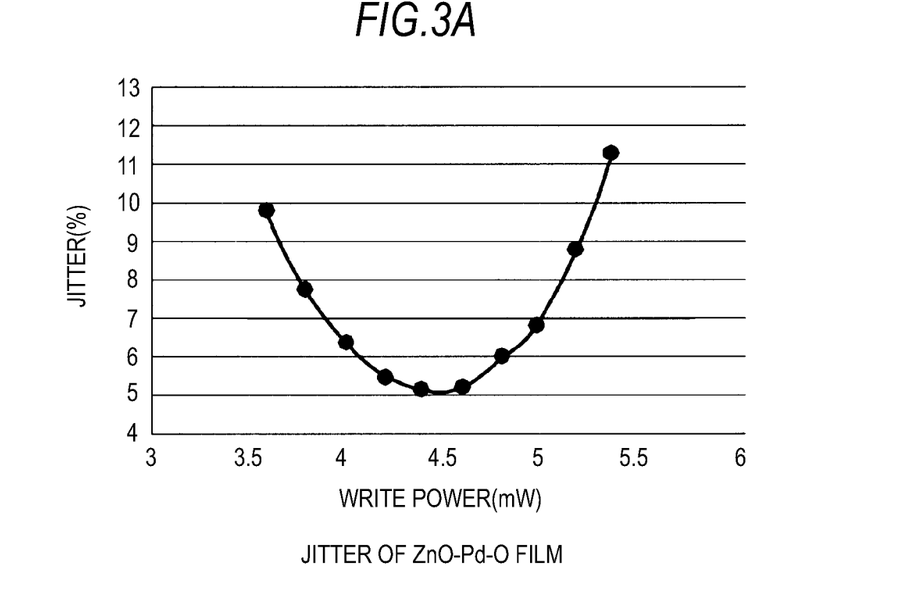
FIGS. 3A and 3B are explanatory views of the recording and reproduction characteristics in the case of a Zn—Pd—O recording film of the embodiment.
Figure 3B:
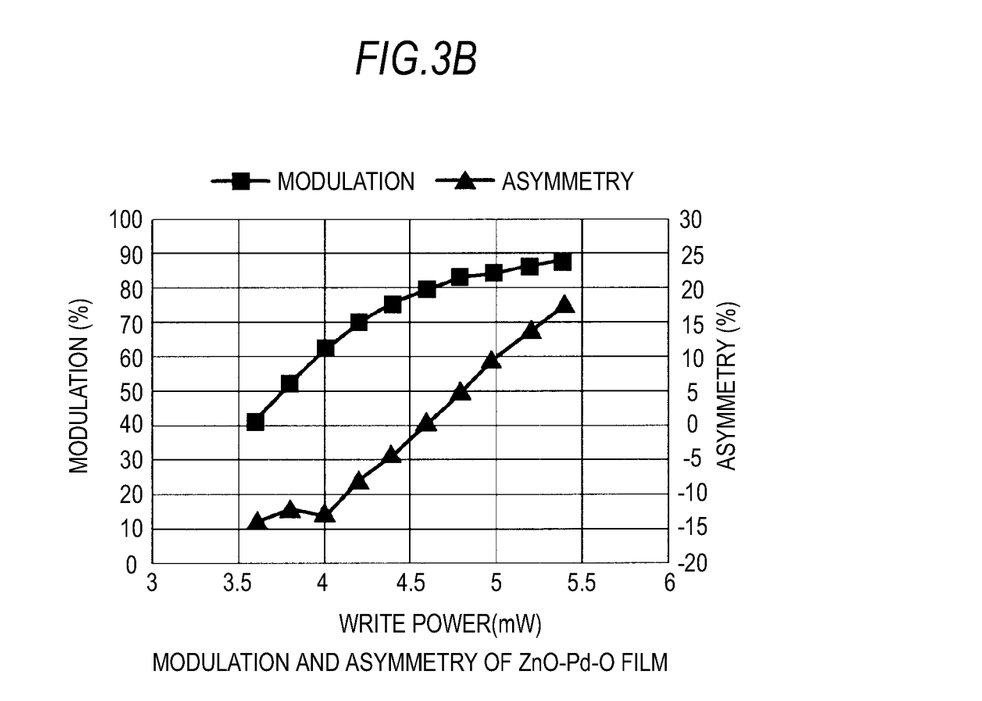

FIG. 3A shows jitter characteristics, and FIG. 3B shows the characteristics of modulation and asymmetry.

As can be seen from the results in FIGS. 3A and 3B, a very satisfactory result of 5.1% was obtained as the value of jitter, for example, when the write laser power was about 4.5 mW.

In addition, when the write laser power is 3.5 mW, the modulation is 40% or more which is a sufficient level. Moreover, when the write laser power is 4 mW to 5.5 mW, the modulation is 60% to 90% which is very satisfactory.

Also for the asymmetry, a suitable value is acquired in the range of 4.2 mW to 5.2 mW.

These results show that the write power margin is also large.

That is, when the information recording layer 2 with a single film of a Zn—Pd—O recording film was formed, very good recording and reproduction characteristics were obtained.

Second Experiment

As a disc in the <second experiment>, the information recording layer 2 using a Zn—In—Sn—Pd—O recording film with a thickness of 45 nm was formed on the substrate 1 made of polycarbonate so as to have a single-layer structure, and the light transmissive layer 3 with a thickness of 100 μm was formed.

ZnO, $In_2O_3$, $SnO_2$, and Pd were used as targets at the time of sputtering of the Zn—In—Sn—Pd—O recording film.

The composition was adjusted by controlling the sputtering power of each target.

The composition was set to satisfy Zn:In+Sn=6:4, In:Sn=9:1, and Zn+In+Sn:Pd=6:4.

Ar gas and $O_2$ gas were used at the time of sputtering.

The gas flow rate was set to 70 sccm for Ar gas and 30 sccm for $O_2$ gas.

Similar to the first experiment, disc evaluation was performed by recording five tracks continuously by 1× recording speed (4.92 m/sec) and measuring the jitter, modulation, and asymmetry of a middle track.

Figure 4A:
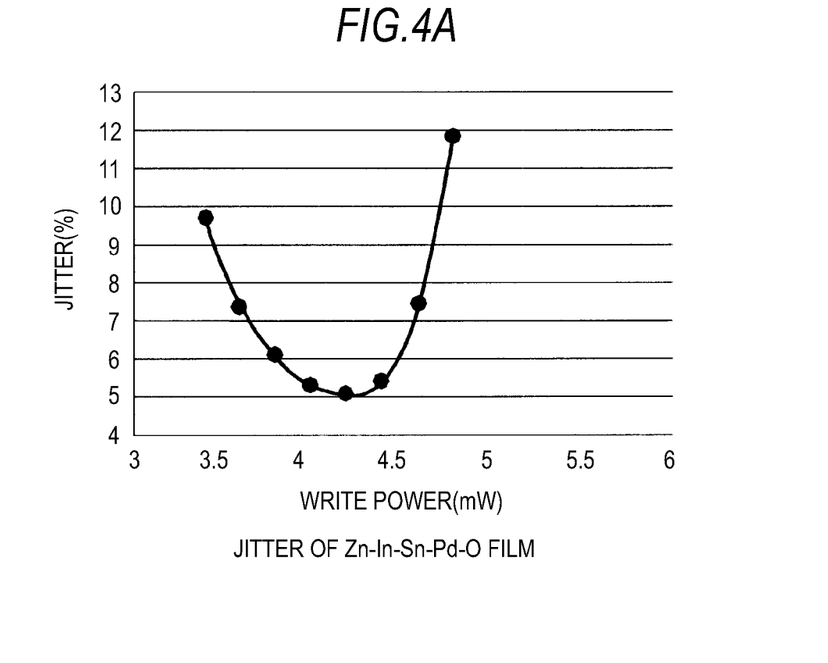
FIGS. 4A and 4B are explanatory views of the recording and reproduction characteristics in the case of a Zn—In—Sn—Pd—O recording film of the embodiment.
Figure 4B:
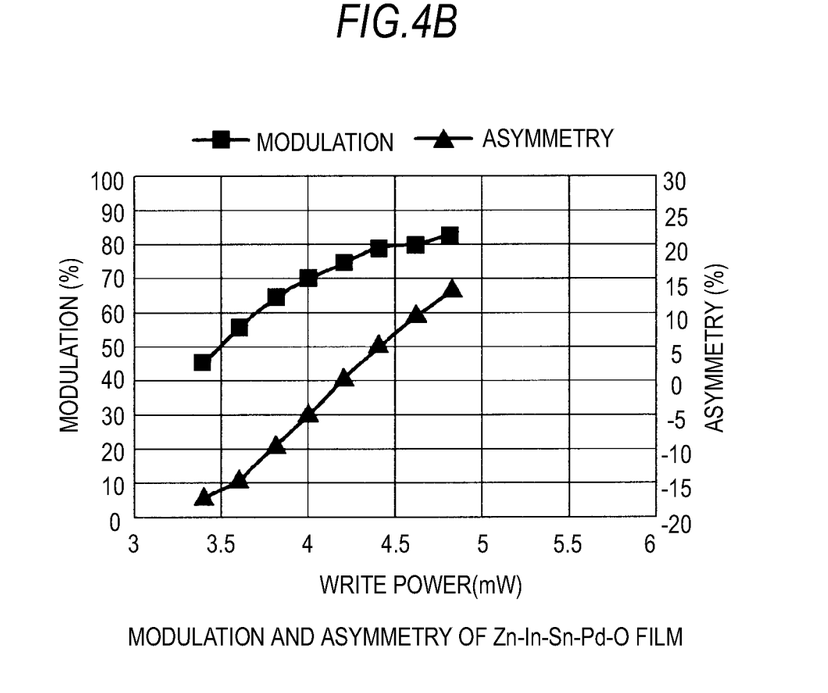

FIG. 4A shows a jitter characteristic, and FIG. 4B shows the characteristics of modulation and asymmetry.

As can be seen from the results in FIGS. 4A and 4B, a very satisfactory result of 5.2% was obtained as the value of jitter, for example, when the write laser power was about 4.2 mW.

In addition, when the write laser power is about 3.5 mW, the modulation is 40% or more which is a sufficient level. Moreover, when the write laser power is 4 mW to 5 mW, the modulation is about 70% to 80% which is very satisfactory.

Also for the asymmetry, a suitable value is acquired in the range of 3.6 mW to 4.8 mW.

These results show that the write power margin is also large.

That is, also when the information recording layer 2 with a single film of a Zn—In—Sn—Pd—O recording film was formed, very good recording and reproduction characteristics were obtained. Moreover, compared with the first embodiment, it can be said that suitable characteristics are obtained in the lower laser power range in the case of the Zn—In—Sn—Pd—O recording film than in the case of the Zn—Pd—O recording film.

Third Experiment

As a disc in the <third experiment>, the Zn—In—Sn—Pd—O recording film was used similar to the second experiment, but the protective film 2b was also formed on the top and bottom surfaces of the recording film 2a as shown in FIG. 1C.

$In_2O_3$ was used for the protective film 2b.

The thickness of the Zn—In—Sn—Pd—O recording film 2a was set to 60 nm, and the thickness of each of the $In_2O_3$ protective films 2b formed on the top and bottom surfaces of the recording film 2a was set to 5 nm. Accordingly, the thickness of the information recording layer 2 is 70 nm.

The composition was set to satisfy Zn:In+Sn=5:5, In:Sn=9:1, and Zn+In+Sn:Pd=8:2.

Others are the same as those in the second experiment.

Figure 5A:
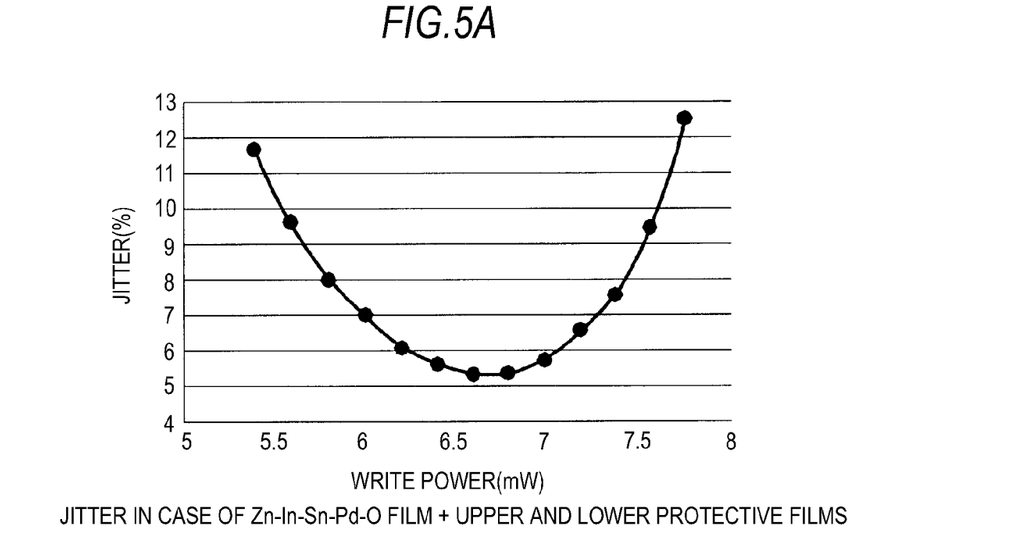
FIGS. 5A and 5B are explanatory views of the recording and reproduction characteristics in the case where a protective film is added to the Zn—In—Sn—Pd—O recording film of the embodiment.
Figure 5B:
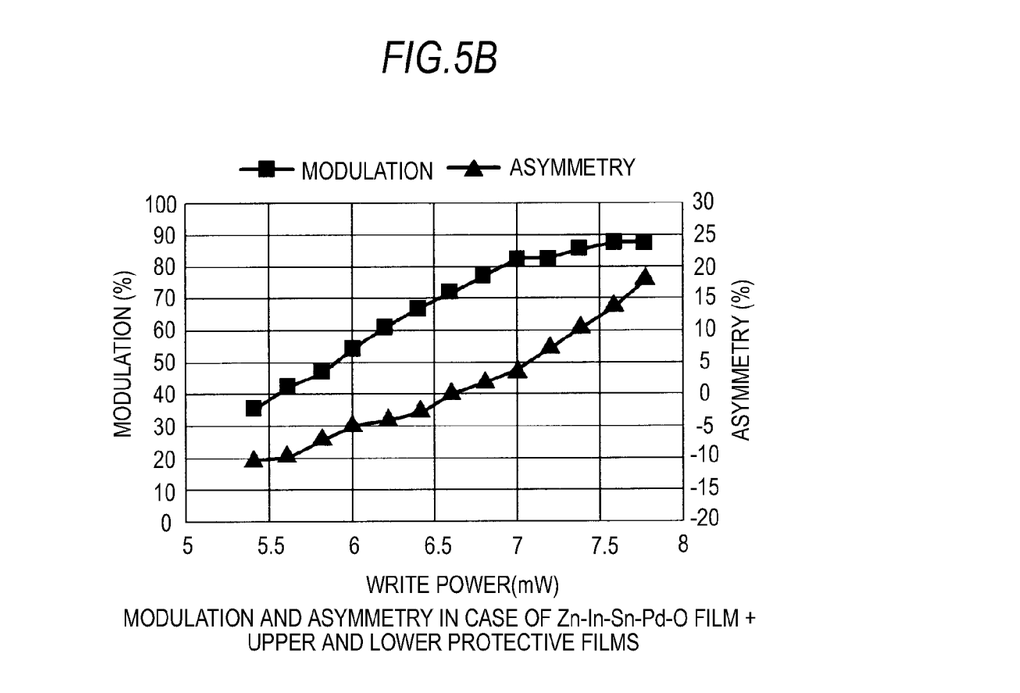

FIG. 5A shows a jitter characteristic, and FIG. 5B shows the characteristics of modulation and asymmetry.

Since the composition or the film thickness is different, it is difficult to simply compare the results shown in FIGS. 5A and 5B with the first and second experiments. However, also in this case, the jitter value of 5.2% was obtained and satisfactory results were obtained for the modulation or the asymmetry.

That is, it was seen that although the durability of the information recording layer 2 could be improved by providing the protective film 2b, satisfactory recording and reproduction characteristics were also obtained in this case.

Fourth Experiment

As a disc in the <fourth experiment>, the information recording layer 2 using an Al—Pd—O recording film with a thickness of 45 nm was formed on the substrate 1 made of polycarbonate so as to have a single-layer structure, and the light transmissive layer 3 with a thickness of 100 μm was formed.

Al2O3 and Pd were used as targets at the time of sputtering of the Al—Pd—O recording film.

The composition was adjusted by controlling the sputtering power of each target.

The composition was set to satisfy Al:Pd=4:6.

Ar gas and O2 gas were used at the time of sputtering.

The gas flow rate was set to 70 sccm for Ar gas and 30 sccm for O2 gas.

Disc evaluation was performed by recording five tracks continuously by 1× recording speed (4.92 m/sec) and measuring the jitter, modulation, and asymmetry of a middle track.

Figure 6A:
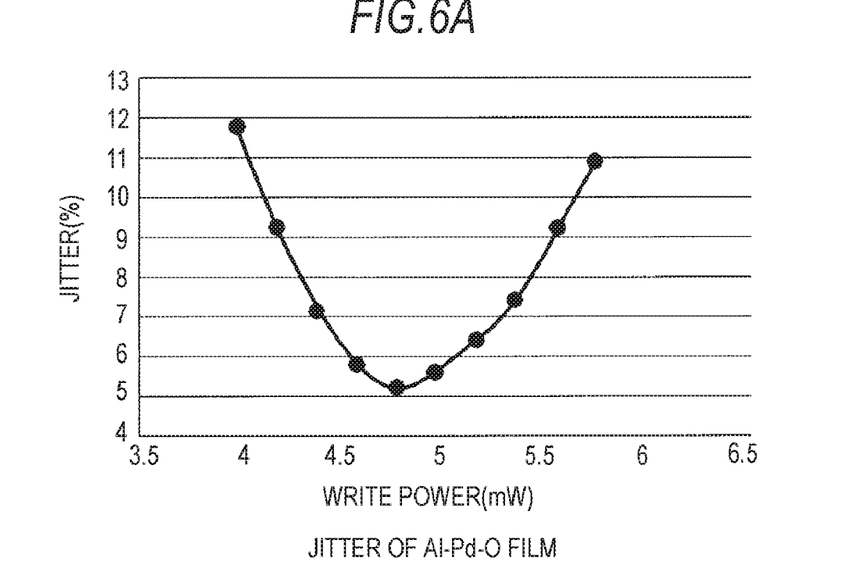
FIGS. 6A and 6B are explanatory views of the recording and reproduction characteristics in the case of an Al—Pd—O recording film of the embodiment.
Figure 6B:
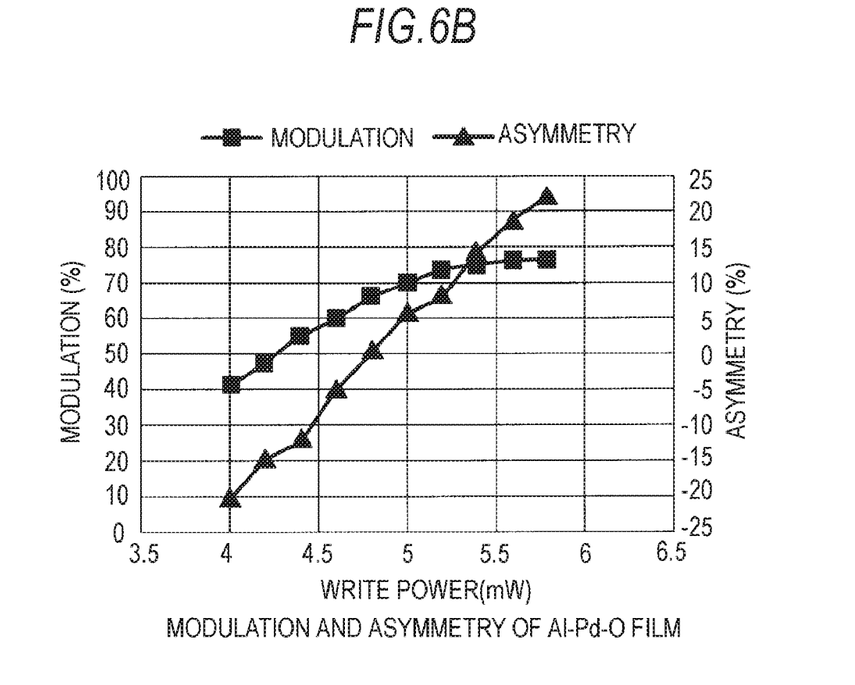

FIG. 6A shows a jitter characteristic, and FIG. 6B shows the characteristics of modulation and asymmetry.

As can be seen from the results in FIGS. 6A and 6B, a very satisfactory result of 5.2% was obtained as the value of jitter, for example, when the write laser power was about 4.8 mW.

In addition, when the write laser power is 4 mW, the modulation is 40% or more which is a sufficient level. Moreover, when the write laser power is 4.5 mW to 6 mW, the modulation is 60% to 75% which is very satisfactory.

Also for the asymmetry, a suitable value is acquired in the range of 4.5 mW to 5.4 mW.

These results show that the write power margin is sufficient.

That is, when the information recording layer 2 with a single film of an Al—Pd—O recording film was formed, very good recording and reproduction characteristics were obtained.

Fifth Experiment

As a disc in the <fifth experiment>, the information recording layer 2 using a Zn—Al—In—Pd—O recording film with a thickness of 60 nm was formed on the substrate 1 made of polycarbonate so as to have a single-layer structure, and the light transmissive layer 3 with a thickness of 100 μm was formed.

The composition was set to satisfy Zn:Al:In=67:8:25.

Others are the same as those in the second experiment.

Figure 7A:
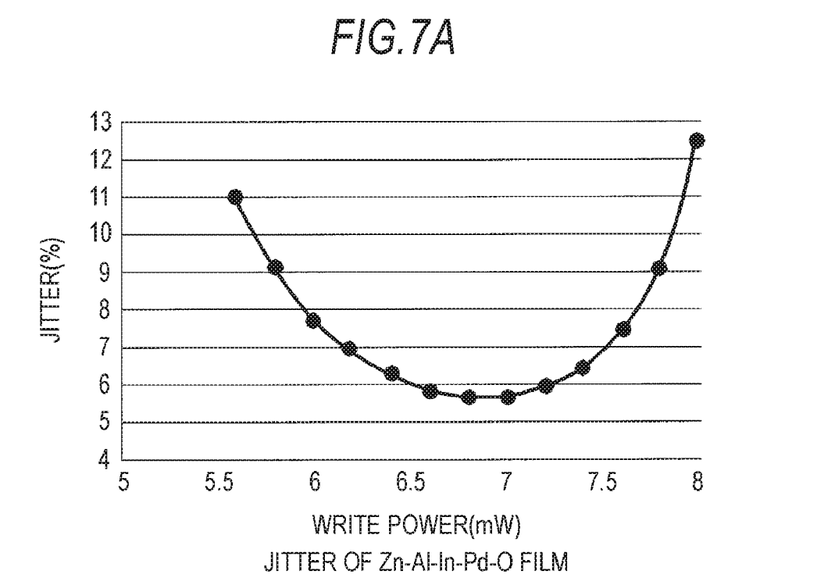
FIGS. 7A and 7B are explanatory views of the recording and reproduction characteristics in the case of a Zn—Al—In—Pd—O recording film of the embodiment.
Figure 7B:
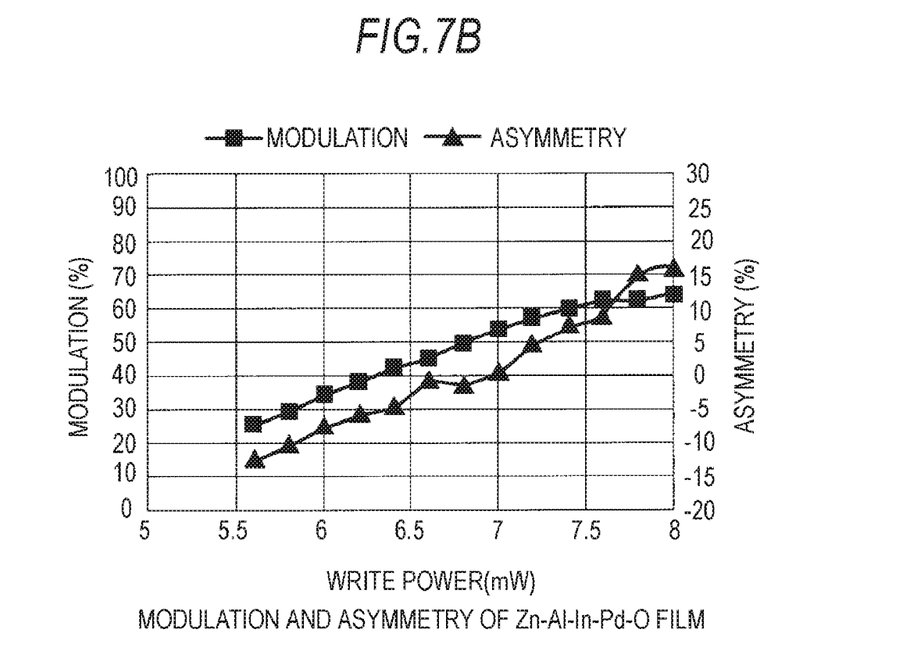

FIG. 7A shows a jitter characteristic, and FIG. 7B shows the characteristics of modulation and asymmetry.

As can be seen from the results in FIGS. 7A and 7B, a very satisfactory result of 5.6% was obtained as the value of jitter, for example, when the write laser power was about 6.8 to 7 mW.

In addition, when the write laser power is 6.2 mW or more, the modulation is 40% or more which is a satisfactory level.

Also for the asymmetry, a suitable value is acquired in the range of 5.8 mW to 7.6 mW.

These results show that the write power margin is also large.

That is, also when the information recording layer 2 with a single film of a Zn—Al—In—Pd—O recording film was formed, very good recording and reproduction characteristics were obtained.

As can be seen from the above experimental results, very good recording and reproduction characteristics can be obtained in the optical disc of the present embodiment.

Moreover, since sufficient reflectance is obtained for the information recording layer, a reflective film is not necessary. Accordingly, the information recording layer can have a very simple layer structure, such as a single-layer structure or a multi-layer structure in which only a protective film is added. As a result, a BD-R disc (recordable Blu-ray disc) and the like can be efficiently manufactured and the cost can be reduced, for example.

In addition, since it is easy to control the reflectance/transmittance of the information recording layer 2, it is suitable not only for a single-layer disc but also for a multi-layer disc of dual-layer or higher.

Although the examples of optical discs have been described, the present application can be applied without being limited to the disc-shaped optical recording medium. For example, the present application may also be applied to a card-shaped optical recording medium.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical recording medium comprising:
   a substrate;
   an information recording layer that is formed on the substrate and that has a recording film, which contains Zn or Al, Pd, and oxygen and in which the amount of oxygen is larger than that in a stoichiometric composition when Zn or Al is completely oxidized to become ZnO or $Al_2O_3$, and at least some of the Pd atoms are oxidized to become PdO or $PdO_2$; and
   a light transmissive layer formed on the information recording layer.

2. The optical recording medium according to claim 1, wherein the information recording layer further contains In or Sn.

3. The optical recording medium according to claim 1, wherein the information recording layer is formed in a single-layer structure which has only the recording film.

4. The optical recording medium according to claim 1, wherein the information recording layer is formed in a multi-layer structure which has the recording film and a protective film.

5. An optical recording medium comprising:
   a substrate;
   an information recording layer that is formed on the substrate and that has a recording film, which contains Zn or Al, Pd, and oxygen, and In or Sn, and in which the amount of oxygen is larger than that in a stoichiometric composition when Zn or Al is completely oxidized to become ZnO or $Al_2O_3$; and
   a light transmissive layer formed on the information recording layer.

* * * * *